United States Patent [19]

Magahed

[11] 4,397,925

[45] Aug. 9, 1983

[54] ALKALINE BATTERY WITH REDUCING AGENTS IN THE ELECTROLYTE

[75] Inventor: El-Sayed A. Magahed, Madison, Wis.

[73] Assignee: Ray-O-Vac Corporation, Madison, Wis.

[21] Appl. No.: 311,537

[22] Filed: Oct. 15, 1981

[51] Int. Cl.$^3$ .............................................. H01M 6/04
[52] U.S. Cl. ..................................... 429/207; 429/50; 429/219; 429/224; 429/229
[58] Field of Search ............... 429/206, 207, 229, 219, 429/224, 50

[56] References Cited

U.S. PATENT DOCUMENTS

| | | | |
|---|---|---|---|
| 2,681,376 | 6/1954 | Denison et al. ...................... | 429/219 |
| 3,055,964 | 9/1962 | Solomon et al. ..................... | 429/219 |
| 3,615,858 | 10/1971 | Soto-Krebs ...................... | 429/220 X |
| 4,009,056 | 2/1977 | Megahed et al. .................... | 429/206 |
| 4,015,056 | 3/1977 | Megahed et al. .................... | 429/219 |
| 4,021,598 | 5/1977 | Maruishi et al. ..................... | 429/206 |
| 4,048,405 | 9/1977 | Megahed ............................. | 429/206 |
| 4,068,049 | 1/1978 | Maruishi et al. .................... | 429/206 |
| 4,209,578 | 6/1980 | Balters ................................. | 429/206 |
| 4,250,234 | 2/1981 | Langan ................................ | 429/206 |

*Primary Examiner*—Charles F. Lefevour
*Attorney, Agent, or Firm*—Raymond J. Kenny; Francis J. Mulligan, Jr.

[57] ABSTRACT

An alkaline cell containing an effective amount of an electrolyte soluble reducing agent of alkali metal borohydrides, quaternary ammonium borohydrides, complex aluminum hydrides or hydrazine.

15 Claims, No Drawings

ALKALINE BATTERY WITH REDUCING AGENTS IN THE ELECTROLYTE

TECHNICAL FIELD

The present invention is concerned with alkaline cells and, more particularly, with alkaline button cells having cathodes which are extended with high potential oxide.

Very briefly, if one assembles an alkaline electrochemical cell having an anode of an active metal, for example zinc, an alkaline electrolyte, an appropriate separator and a cathode, the open circuit voltage (OCV) of that cell will be determined by the nature of the anode and the cathode. Especially in view of the small volumes available in button cells, it is generally desirable to increase the energy content of the cell by including, as much as possible, high potential oxide in the cell as cathode. Examples of this situation include extending a monovalent silver oxide ($Ag_2O$) cathode with divalent silver oxide (AgO), mercury oxide (HgO), and/or a permanganate compound ($KMnO_4$, $LiMnO_4$, $BaMnO_4$, etc.) In the ordinary case of using an AgO cathode alone or extending an $Ag_2O$ cathode with AgO, a cathode will show an OCV typical of the high potential oxide and will discharge at two distinct levels (plateaus), one characteristic of the Zn/AgO couple and the other characteristic of the $Zn/Ag_2O$ couple. The high OCV and impedance values and the two plateau types of discharge are undesirable in that the cell will either be unsuitable for powering a microelectronic circuit at one or the other voltage, or the powered device will require more complexity in the microelectronic circuit to tolerate the high OCV-impedance values and the two voltage operation. Accordingly, it has been an object of search in the art to provide cells with low impedance and single voltage plateau discharge, while at the same time providing such cells with maximized energy capacity.

BACKGROUND ART

Speaking particularly with respect to alkaline silver cells, a number of schemes have been employed to provide single plateau discharge characteristic of the $Zn/Ag_2O$ couple while employing AgO in the cathode of these cells. These schemes disclosed in various patents present difficulties. In some instances, the manufacturing techniques are difficult to control and in other instances there is a danger of cell voltage rising from the $Zn/Ag_2O$ couple level to the Zn/AgO couple level after a short period of storage at room temperature. The following disclosures are pertinent:

Dension U.S. Pat. No. 2,681,376 discloses the use of potassium ethylate in an electrolyte in a Zn/AgO cell; Solomon U.S. Pat. No. 3,055,964, Soto-Krebs U.S. Pat. No. 3,615,858, Megahed et al U.S. Pat. Nos. 4,009,056 and 4,015,056, Megahed U.S. Pat. No. 4,048,405 and Naruishi et al U.S. Pat. No. 4,068,049 all disclose partial pre-reduction of an AgO cathode pellet prior to cell assembly; and Balters U.S. Pat. No. 4,209,578 discloses the use of chemical reducing agents in a cell to form a silver layer on a positive electrode which contains $Ag_2O$ as a potential determining component. The Langan U.S. Pat. No. 4,250,234, not believed to be prior art to the present disclosure suggests incorporation of a mild reducing agent in an AgO cell catholyte or electrolyte for the purpose of reducing a portion of the AgO.

SUMMARY OF THE INVENTION

The present invention contemplates an electrochemical cell having an active metal anode, an aqueous alkaline electrolyte, a suitable separator and a cathode containing at least one reducible oxidic species. The reducible oxide species is capable of exhibiting an undesirable high voltage and/or high impedance level at times throughout its useful life when coupled with said active metal anode. The undesirable high voltage and/or high impedance level of said cathode is eliminated by including in the cell at a location available to the electrolyte, or specifically in the electrolyte, at cell closure, a reducing agent from the group of soluble complex hydrides particularly one or more selected from the group of alkaline metal borohydrides, complex aluminum hydrides and quaternary ammonium borohydrides and hydrazine. The reducing agent is present in an amount sufficient to reduce about 1% to about 10% by weight of that oxidic species (having the undesirable high OCV and/or high impedance when coupled with active metal anode) to the metal of said oxidic species or to a species in a lower oxidation state.

Generally speaking, when as is most convenient, the reducing agent is included in the electrolyte, the electrolyte will contain about 0.5% to about 12% by weight of sodium borohydride or a chemically equivalent amount of other strong reducing agent. The type of strong reducing agent used depends upon the nature of the cell. As is well known in the art the cell components, anode, cathode, separator, etc. are contained in a casing which may be sealed or vented. If the cell is sealed, a non-gassing reducing agent such as a borohydride is used. If the cell is vented, a gassing reducing agent, i.e. one that produces a gas as a product of oxidation thereof, such as hydrazine can be used. Of course, a non-gassing reducing agent can also be used in vented cells. The strong reducing agent can be associated with the anode or separator as well as, or in place of being in the electrolyte at the time of cell closure.

Strong reducing agents useful in the practice of the present invention include but are not limited to borohydrides of lithium, sodium, potassium, cesium and rubidium, lithium aluminum hydride, sodium aluminum hydride, tetramethylammonium borohydride, tetraethylammonium borohydride and hydrazine.

After cell closure, the reducing agent in or available to the electrolyte uniformly penetrates along with electrolyte through the barrier system of the cell and then gradually and uniformly reduces the surface of the cathode material while the cell is in storage prior to use. This gradual and uniform reduction produces cells with uniform voltages which are characteristic of the active metal/low potential oxide couple while retaining the energy content of at least about 90% by weight of the higher potential oxide. Also, the discharge performance of the cells will be typical of the low potential oxide.

Oxide systems which can be used as initially placed cathodes in cells in accordance with the present invention include $Ag_2O$—AgO blends containing at least about 5% and up to 98.5% by weight of AgO; $MnO_2$—HgO blends containing at least about 10% and up to about 95% by weight $MnO_2$: Permanganate ($KMnO_4$, $AgMnO_4$, $CuMnO_4$, $Ca(MnO_4)_2$, $Ba(MnO_4)_2$, $LiMnO_4$)—$Ag_2O$ blends containing at least about 5% and up to 95% by weight $Ag_2O$.

Cells of the present invention, particularly cells made with zinc as the active metal anode and AgO or Ag₂O—AgO blends as the initially placed cathode which contain reducing agents in the electrolyte are characterized by relatively low impedance and relatively high flash currents. This phenomenon exists even under circumstances where, in accordance with the teachings of U.S. Pat. No. 4,009,056 discussed previously, cathode consolidations of AgO were double treated with reducing agents prior to assembly into cells.

PREFERRED MODE FOR CARRYING OUT THE INVENTION

A plurality of lots, 40 cells per lot were made nominally using the Zn/AgO couple in association with an electrolyte containing 40% by weight of potassium hydroxide and 1% by weight of zinc oxide in water. The cells were sealed, button type cells known in the trade as RW 44 size. The initially prepared cathode consolidation was essentially pure AgO compacted at a pressure of about 35 kg/mm². Average electrical characteristics of these cells including impedance, open circuit voltage (OCV), closed circuit voltage through a 30 ohm load (CCV) and flash current (through a dead short) in amperes as measured three days after cell closure are set forth in Table I.

The data in Table I shows that inclusion of at least about 0.5% of sodium borohydride in the cell electrolyte added to the cell prior to closure can replace the more tedious and expensive pretreatment of the AgO cathode consolidations and still achieve low cell impedance, OCV characteristics of the Zn/Ag₂O couple, high CCV and high flash current. Table I also shows that addition of at least about 0.25% NaBH₄ to the cell electrolyte significantly lowers cell impedance and OCV and raises the flash current even when an AgO cathode pellet has been pretreated with a mild reducing agent.

A series of tests similar to those reported in Table I, except that AgO pellets were dipped in 1% methanol solution instead of 10% methanol solution while the consolidations were treated with hydrazine are specified in Table II. Sodium borohydride was present in electrolyte in an amount of 1% by weight in lot No. 7 and 8. Results of these tests, the electrical measurement being taken three days after cell closure and coulometric measurements being made 48 hours after cell closure, are set forth in Table II.

TABLE II

| Lot No. | Consolidation Pretreatment | Impedance (ohms) | OCV (V) | CCV (V) | Flash Current (amperes) | Pellet Capacity (MAH) | % Red in Pellet Capacity |
|---|---|---|---|---|---|---|---|
| E | No | 27.3 | 1.74 | 1.00 | 0.47 | 385.3 | — |
| F | Yes | 29.6 | 1.71 | 1.38 | 0.68 | 356.7 | 7.4 |
| 7 | Yes | 2.1 | 1.61 | 1.46 | 0.74 | 354.3 | 8.1 |
| 8 | No | 2.3 | 1.59 | 1.36 | 0.70 | 375.9 | 2.4 |

The data in Table II shows that 1% by weight of sodium borohydride in the electrolyte included in a button cell prior to closure can provide cell electrical characteristics in a nominal Zn/AgO cell equivalent to those provided by consolidation pretreatment at less a sacrifice of cathode pellet coulometric capacity. Thus Lot 8 shows only a 2.4% reduction in coulometric capacity of the cathode while providing the necessary decrease from the high OCV of 1.74 volts of Lot E and substantially increasing the CCV and flash current.

In another series of tests involving nominally pure AgO consolidated pellets in RW 44 button cells, Lots G and H used no additive in a 40% by weight potassium hydroxide 1% by weight zinc oxide aqueous electrolyte and Lot 9 used the same basic electrolyte but containing 2.5% NaBH₄. Electrical characteristics of these cells were measured after 3 months storage at room temperature. Results of these tests are set forth in Table II.

TABLE III

| Lot No. | Pretreatment of Cathode Pellet | Impedance (ohms) | OCV (V) | CCV (V) | Flash Current (amps) |
|---|---|---|---|---|---|
| G | methanol - 1 minute | 21.9 | 1.77 | 1.02 | 0.22 |
| H | methanol - 10 minutes | 27.6 | 1.67 | 0.81 | 0.23 |
| 9 | methanol - 10 minutes | 2.9 | 1.60 | 1.46 | 0.57 |

The data in Table III shows that the borohydride inclusion in electrolyte is clearly effective for extended periods of storage in lowering impedance and OCV and raising CCV and flash current.

TABLE I

| Lot | Electrolyte System | Pellet* Pretreatment | Consolidation** Pretreatment | Impedance (ohms) | OCV (V) | CCV (V) | Flash Current (Amperes) |
|---|---|---|---|---|---|---|---|
| A | no additive | Yes | No | 27.8 | 1.75 | 1.02 | 0.46 |
| 1 | add 0.25% NaBH₄ | Yes | No | 16.8 | 1.60 | 1.34 | 0.74 |
| 2 | add 0.50% NaBH₄ | Yes | No | 3.7 | 1.60 | 1.38 | 0.76 |
| 3 | add 1.00% NaBH₄ | Yes | No | 2.2 | 1.59 | 1.37 | 0.74 |
| B | no additive | Yes | Yes | 25.9 | 1.72 | 1.37 | 0.62 |
| 4 | add 0.25% NaBH₄ | Yes | Yes | 9.0 | 1.62 | 1.43 | 0.80 |
| 5 | add 0.50% NaBH₄ | Yes | Yes | 3.4 | 1.61 | 1.42 | 0.79 |
| 6 | add 1.00% NaBH₄ | Yes | Yes | 2.2 | 1.61 | 1.45 | 0.77 |
| C | no additive | No | No | 91.0 | 1.84 | 0.84 | 0.10 |
| D | no additive | No | Yes | 60.5 | 1.84 | 1.10 | 0.20 |

*AgO pellets were dipped in a mild reducing agent (10% methanol in 30% KOH at 80° C. for 5 minutes) as described in U.S. Pat. No. 4,015,056.
**Consolidated pellets of AgO were dipped in a strong reducing agent (1% solution of hydrazine in methanol at 21° C. for 5 minutes) as described in U.S. Pat. Nos. 4,015,056 and 4,009,056.

Additional tests wherein from 1 to 12% by weight of sodium borohydride (solid or in 40% NaOH solution) was added to a 40% KOH, 1% ZnO aqueous electrolyte used in RW 44 type button cells having a 50—50 mix AgO—Ag$_2$O cathode showed that coulometric capacity of the cells was not drastically reduced from initial coulometric capacity after a storage of 12 weeks at 113° F. and 50% relative humidity. Capacity measured on discharge through 300 ohms (16 hours per day) showed a retention of from about 84% to 98% of initial capacity. Discharge through 625 ohms (16 hours per day) showed a retention of from about 89% to 96% of initial capacity.

In another series of tests, NaBH$_4$ was compared to potassium borohydride (KBH$_4$) and Rubidium borohydride (RbBH$_4$) in an RW 44 type cell with a cathode of 50% AgO and 50% Ag$_2$O. The borohydride was added in 0.5%, 1.0% and 2% by weight to 40% KOH, 1% ZnO aqueous electrolyte. Cell impedance, OCV and flash current were measured three days after making the cells, and later after 90 days of storage at room temperature. Results of these tests are set forth in Table IV.

TABLE IV

| Lot | Electrolyte System | Cell Target at 3 days RT | | | Cell Target at 90 days RT | | |
|---|---|---|---|---|---|---|---|
| | | Impedance (ohms) | OCV (V) | Flash Current (Amperes) | Impedance (ohms) | OCV (V) | Flash Current (Amperes) |
| I | no additive | 26.4 | 1.83 | 0.28 | 18.7 | 1.80 | 0.27 |
| 10 | add 0.5% NaBH$_4$ | 2.0 | 1.59 | 0.80 | 2.4 | 1.59 | 0.63 |
| 11 | add 1.0% NaBH$_4$ | 2.1 | 1.59 | 0.72 | 2.5 | 1.58 | 0.59 |
| 12 | add 2.0% NaBH$_4$ | 3.4 | 1.59 | 0.48 | 4.3 | 1.59 | 0.42 |
| 13 | add 0.5% KBH$_4$ | 2.5 | 1.59 | 0.78 | 2.3 | 1.59 | 0.67 |
| 14 | add 1.0% KBH$_4$ | 2.3 | 1.59 | 0.71 | 2.5 | 1.59 | 0.61 |
| 15 | add 2.0% KBH$_4$ | 2.2 | 1.59 | 0.71 | 2.3 | 1.59 | 0.63 |
| 16 | add 0.5% RbBH$_4$ | 24.7 | 1.80 | 0.64 | 17.6 | 1.77 | 0.30 |
| 17 | add 1.0% RbBH$_4$ | 16.0 | 1.64 | 0.57 | 19.7 | 1.74 | 0.31 |
| 18 | add 2.0% RbBH$_4$ | 3.9 | 1.62 | 0.49 | 3.4 | 1.61 | 0.55 |

The data in Table IV shows that KBH$_4$ inclusion in electrolyte is clearly effective in reducing cell impedance and raising flash current while controlling cell voltage at the Zn/Ag$_2$O couple level. Rubidium borohydride is more effective however at the higher concentration level of 2.0% (a concentration level equivalent to about 0.75% of sodium borohydride).

To show the superior effect of borohydride on Zn/AgO cell performance, some mild reducing agents were added to the electrolyte (40% KOH + 1% ZnO) of RW 44 type cells. The reducing agents were added in amounts capable of removing the same amount of capacity from the cathode as 0.5% NaBH$_4$. The cathode pellets were essentially pure AgO treated with 10% methanol in 30% KOH for 5 minutes at 80° C. Results are set forth in Table V.

TABLE V

| Lot | Electrolyte System | Impedance (Ohms) | OCV (V) | OCV (V) | Flash Current (Amperes) |
|---|---|---|---|---|---|
| J | no additive | 55.8 | 1.81 | 1.40 | 0.58 |
| K | add 0.5% NaBH$_4$ | 4.4 | 1.62 | 1.41 | 0.57 |
| L | add 3.2% acetic acid | 53.3 | 1.81 | 1.34 | 0.48 |
| M | add 2.5% formic acid | 50.0 | 1.81 | 1.37 | 0.58 |
| N | add 1.9% Tartaric acid | 44.2 | 1.70 | 1.39 | 0.54 |
| O | add 11.2% Citric acid | 66.0 | 1.80 | 1.39 | 0.52 |
| P | add 2.3% Ascorbic acid | 43.3 | 1.72 | 1.41 | 0.62 |
| Q | add 10.0% methanol | 40.0 | 1.76 | 1.40 | 0.53 |
| R | add 1.0% Formaldehyde | 36.0 | 1.74 | 1.40 | 0.52 |
| S | add 2.0% Dextrose | 79.0 | 1.81 | 1.32 | 0.36 |

OCV was measured across 30 ohm resistor.

The data in Table V shows that NaBH$_4$ inclusion in electrolyte clearly reduces cell impedance and keeps cells voltage at the Zn/Ag$_2$O couple level while other mild reducing agents failed to show similar results. While under certain circumstances of which applicant is not now aware, mild reducing agents might give the beneficial effects provided by alkali metal borohydrides and like strong reducing agents, it is deemed that the functioning of the two types of reducing agents are different in the milieu of the present invention because operating in accordance with the present invention insures success in achieving the desired results whereas use of mild reducing agents is a matter of chance.

In a still further series of tests, the voltage stability, impedance and flash current were measured with respect to RW 54 type cells containing a zinc anode, an alkaline electrolyte and a mercuric oxide cathode extended with $\beta$MnO$_2$. Cell characteristics were measured immediately after cell closure and after 4 weeks storage at 130° F. and 50% relative humidity. The results of these tests are set forth in Table IV. Values not in brackets represent average values and the values in brackets represent the range of item measured on lot sizes of 40 cells.

The data in Table VI shows that cells in accordance with the invention (Lots 19 and 20) immediately achieved OCV's characteristic of the Zn/HgO couple. After 4 weeks storage, the cells of the invention exhibited an advantageously low impedance and high flash current.

TABLE VI

| | Item | Lot No. T | Lot No. 19 | Lot No. 20 |
|---|---|---|---|---|
| A. | Cell Electrolyte | 30% NaOH + 1% ZnO | 30% NaOH + 1% ZnO + 1% NaBH$_4$ | 30% NaOH + 1% ZnO + 1% KBH$_4$ |
| B. | Initial Cell Characteristics | | | |
| | Imp. (ohms) | 44.9 (16.5–58.9) | 42.9 (34.6–55.9) | 54.8 (38.9–71.1) |
| | OCV (volts) | 1.465 (1.43–1.51) | 1.37 (1.36–1.38) | 1.36 (1.36–1.37) |
| | CCV (volts) | 1.450 (1.43–1.49) | 1.36 (1.35–1.39) | 1.35 (1.34–1.35) |

TABLE VI-continued

| Item | Lot No. T | Lot No. 19 | Lot No. 20 |
|---|---|---|---|
| Flash Current (amps) | 0.033 (0.03–0.08) | 0.026 (0.02–0.03) | 0.018 (0.01–0.03) |
| C. Initial Cell Capacity (mAH) on 1500 Ohms Cont., RT | | | |
| to 1.20V | 124.2 | 121.5 | 117.2 |
| to 0.90V | 152.3 | 150.5 | 152.5 |
| D. Cell Characteristics After 4 Wks. of 130–50% | | | |
| Imp. (ohms) | 14.3 (6.4–21.6) | 6.5 (5.0–8.7) | 6.2 (5.1–7.3) |
| OCV (volts) | 1.42 (1.41–1.43) | 1.39 (1.38–1.40) | 1.38 (1.37–1.38) |
| CCV (volts) | 1.41 (1.38–1.41) | 1.39 (1.38–1.40) | 1.37 (1.36–1.37) |
| Flash Current | 0.12 (0.05–0.22) | 0.21 (0.15–0.26) | 0.21 (0.17–0.25) |

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

The embodiments of the invention in which an exclusive property or privilege is claimed are defined as follows:

1. An electrochemical cell having a stable, desirable, open circuit voltage comprising an active metal anode, an aqueous alkaline electrolyte, a suitable separator and a cathode containing at least one reducible oxidic specie dischargeable over the useful life of said cathode against said active metal anode at both an undesirable high voltage and a desirable lower voltage, said cell being characterized by having an effective amount of an electrolyte-soluble reducing agent selected from the group consisting of alkali metal borohydrides, quaternary ammonium borohydrides, complex aluminum hydrides and hydrazine present in said cell and available to said electrolyte at the time of cell closure.

2. An electrochemical cell as in claim 1 wherein said electrolyte-soluble reducing agent is in said electrolyte at the time of cell closure.

3. An electrochemical cell as in claim 1 wherein said electrolyte-soluble reducing agent is associated with said separator at the time of cell closure.

4. An electrochemical cell as in claim 3 wherein said electrolyte-soluble reducing agent is associated with said active metal anode at the time of cell closure.

5. An electrochemical cell as in claim 1 wherein said reducing agent is present in said electrolyte in an amount sufficient to reduce about 0.1% to about 10% of said reducible oxidic specie.

6. An electrochemical cell as in claim 1 wherein said reducing agent is an alkali metal borohydride.

7. An electrochemical cell as in claim 1 wherein said active metal anode is zinc.

8. An electrochemical cell as in claim 7 wherein the cathode associated with zinc contains divalent silver oxide.

9. An electrochemical cell as in claim 8 wherein the cathode assembled into a cell with electrolyte and a zinc anode is essentially pure divalent silver oxide.

10. An electrochemical cell as in claim 9 wherein the electrolyte at cell closure contains an alkali metal borohydride.

11. An electrochemical cell as in claim 1 wherein the cathode contains mercuric oxide and, as said at least one reducible oxidic species, $\beta$ manganese dioxide.

12. An electrochemical cell as in claim 11 wherein the electrolyte associated with said cathode contains an alkali metal borohydride at the time of cell closure.

13. An electrochemical cell as in claim 1 wherein the cathode is a mixed material selected from the group consisting of AgO—$Ag_2O$ blends containing about 5 to about 98.5, weight percent AgO, permanganate $Ag_2O$ blends containing about 5 to about 95 weight percent $Ag_2O$ and $MnO_2$—$Ag_2O$ blends containing about 10 to about 95 percent by weight $MnO_2$.

14. A process for stabilizing the voltage of an electrochemical cell having an active metal anode, an aqueous alkaline electrolyte, a suitable separator and a cathode containing at least one reducible oxidic specie dischargeable over the useful life of said cathode against said active metal anode at both an undesirable high voltage and a desirable lower voltage, said process comprising assembling said cell components and including in said cell and available to said electrolyte at the time of cell closure an effective amount of an electrolyte-soluble reducing agent selected from the group consisting of alkali metal borohydrides, quaternary ammonium borohydrides, complex aluminum hydrides and hydrazine.

15. A process as in claim 14 wherein an alkali metal borohydride is included in said electrolyte at the time of cell closure.

* * * * *